US 11,493,110 B2

(12) United States Patent
Ulchak et al.

(10) Patent No.: US 11,493,110 B2
(45) Date of Patent: Nov. 8, 2022

(54) SPLICE SYSTEM FOR CONVEYOR BELT

(71) Applicant: Cambridge International, Inc., Cambridge, MD (US)

(72) Inventors: Jeffrey D. Ulchak, Belmont, MA (US); Thomas O. Perdue, Salisbury, MD (US); George H. Messick, Jr., Cambridge, MD (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 17/172,877

(22) Filed: Feb. 10, 2021

(65) Prior Publication Data

US 2021/0164539 A1    Jun. 3, 2021

Related U.S. Application Data

(63) Continuation of application No. 16/262,110, filed on Jan. 30, 2019, now Pat. No. 10,941,834.

(60) Provisional application No. 62/623,888, filed on Jan. 30, 2018.

(51) Int. Cl.
   *F16G 3/10*     (2006.01)
   *B65G 17/08*    (2006.01)

(52) U.S. Cl.
   CPC ............... *F16G 3/10* (2013.01); *B65G 17/08* (2013.01); *B65G 17/083* (2013.01); *B65G 2207/12* (2013.01)

(58) Field of Classification Search
   CPC ......... F16G 3/10; B65G 17/08; B65G 17/083; B65G 2207/12
   See application file for complete search history.

(56) References Cited

U.S. PATENT DOCUMENTS

| | | | |
|---|---|---|---|
| 2,619,306 A | 11/1952 | Van Lake |
| 3,159,267 A | 12/1964 | Jeffrey |
| 3,342,656 A | 9/1967 | Papageorges |
| 4,832,187 A | 5/1989 | Lapeyre |
| 4,886,158 A | 12/1989 | Lapeyre |
| 4,934,518 A | 6/1990 | Lapeyre |

(Continued)

FOREIGN PATENT DOCUMENTS

| CN | 101557998 A | 10/2009 |
|---|---|---|
| CN | 102548875 A | 7/2012 |

(Continued)

OTHER PUBLICATIONS

PCT International Search Report and Written Opinion, PCT/US2019/015516, dated Mar. 29, 2019, 9 pages.

(Continued)

*Primary Examiner* — Gene O Crawford
*Assistant Examiner* — Lester Rushin, III
(74) *Attorney, Agent, or Firm* — Quarles & Brady LLP (57) ABSTRACT

A splice system for a conveyor belt system includes a plurality of spaced tractive rods; a plurality of rows of flat wire pickets transversely disposed with respect to a direction of travel and interconnecting the plurality of spaced tractive rods, wherein at least one of the rows of flat wire pickets includes an outer edge link on each end thereof, the outer edge link including a reverse-turn closed edge on an outer side thereof; and wherein movement of at least one of the plurality of rods is restricted by the reverse-turn closed edge on the outer edge link.

15 Claims, 7 Drawing Sheets

(56) References Cited

U.S. PATENT DOCUMENTS

| | | | |
|---|---|---|---|
| 4,972,942 A * | 11/1990 | Faulkner | B65G 17/086 198/853 |
| 5,024,321 A | 6/1991 | Lapeyre | |
| 5,058,732 A | 10/1991 | Lapeyre | |
| 5,083,660 A | 1/1992 | Horton | |
| 5,105,938 A | 4/1992 | Tan | |
| 5,123,524 A | 6/1992 | Lapeyre | |
| 5,156,262 A | 10/1992 | Horton | |
| 5,156,264 A | 10/1992 | Lapeyre | |
| 5,335,768 A | 8/1994 | Schladweiler | |
| 5,598,916 A | 2/1997 | Horton et al. | |
| 5,816,390 A | 10/1998 | Stebnicki | |
| 5,899,322 A | 5/1999 | Gamble, Jr. | |
| 5,954,187 A | 9/1999 | Hager | |
| 6,345,715 B2 | 2/2002 | Palmaer | |
| 6,354,432 B1 | 3/2002 | Maine, Jr. et al. | |
| 6,371,284 B1 | 4/2002 | Pasch | |
| 6,615,979 B2 | 9/2003 | Etherington et al. | |
| 6,814,223 B1 | 11/2004 | Verdigets et al. | |
| 7,073,662 B2 | 7/2006 | Neely et al. | |
| 7,108,127 B2 | 9/2006 | Krisl | |
| 7,255,227 B2 | 8/2007 | Melancon | |
| 7,284,657 B2 | 10/2007 | Ulsh et al. | |
| 7,331,447 B2 | 2/2008 | Krisl et al. | |
| 7,530,454 B2 * | 5/2009 | Neely | B65G 17/086 198/853 |
| 7,600,632 B2 | 10/2009 | Hall | |
| 7,721,877 B2 | 5/2010 | Maine, Jr. et al. | |
| 7,766,159 B2 | 8/2010 | Krisl | |
| 7,802,675 B2 | 9/2010 | Hall | |
| 8,225,922 B1 | 7/2012 | Fourney | |
| 8,607,967 B2 | 12/2013 | Neely et al. | |
| 8,636,141 B2 | 1/2014 | Neely et al. | |
| 8,720,676 B2 | 5/2014 | Neely et al. | |
| 8,752,698 B2 | 6/2014 | Lasecki et al. | |
| 8,757,366 B2 * | 6/2014 | MacLachlan | B65G 17/08 198/853 |
| 8,857,607 B2 | 10/2014 | Lasecki et al. | |
| 8,985,318 B2 | 3/2015 | Neely | |
| 8,985,319 B2 * | 3/2015 | Chaise | C01B 3/0005 206/0.7 |
| 9,096,380 B2 | 8/2015 | Lasecki et al. | |
| 9,216,859 B2 | 12/2015 | Visconti et al. | |
| 9,522,786 B2 | 12/2016 | Lasecki et al. | |
| 9,764,901 B2 | 9/2017 | Bogle et al. | |
| 10,138,065 B2 | 11/2018 | Bogle et al. | |
| 10,183,809 B2 | 1/2019 | Richardson | |
| 10,442,626 B2 | 10/2019 | Marshall et al. | |
| 2001/0050214 A1 | 12/2001 | Guldenfels | |
| 2010/0258410 A1 | 10/2010 | Wunsch | |
| 2010/0282577 A1 * | 11/2010 | Rettore | B65G 17/086 198/851 |
| 2013/0140146 A1 | 6/2013 | Neely et al. | |
| 2013/0140151 A1 | 6/2013 | Neely et al. | |
| 2013/0140152 A1 * | 6/2013 | Neely | B65G 17/086 198/853 |

FOREIGN PATENT DOCUMENTS

| | | | |
|---|---|---|---|
| CN | 104093647 A | | 10/2014 |
| EP | 0032797 A2 | | 7/1981 |
| EP | 0711714 A1 | | 5/1996 |
| GB | 1066905 A | * | 3/1965 |
| GB | 1066905 A | | 4/1967 |
| GB | 2231318 A | | 11/1990 |
| WO | 2010037187 A1 | | 4/2010 |

OTHER PUBLICATIONS

European Patent Office, Extended Search Report, Application No. 19747494.3, dated Oct. 5, 2021, 14 pages.

China National Intellectual Property Administration, Second Office Action and Search Report, Application No. 201980010913.2, dated Jul. 4, 2022, 13 pages.

* cited by examiner

FIG. 9

SPLICE SYSTEM FOR CONVEYOR BELT

CROSS-REFERENCE TO RELATED APPLICATIONS

This application is a continuation of U.S. patent application Ser. No. 16/262,110 filed on Jan. 30, 2019, which claims priority from U.S. Provisional Application No. 62/623,888 filed on Jan. 30, 2018, the entire contents of which are hereby incorporated by reference as if all fully set forth herein.

TECHNICAL FIELD

The disclosure here is directed to a conveyor belt, more particularly to a conveyor belt having an edge configuration for belt splicing, and still more particularly, to a conveyor belt having an edge configuration to receive a rod therethrough and lock the rod in place without welding or clenching of the rod end.

BACKGROUND

One of the most commonly used types of conveyor belts for carrying diverse products along both straight and horizontally curved paths is a grid conveyor belt. Examples of conventional grid conveyor belts are the Cam-Grid® and the heavy duty Cam-Grid® conveyor belts available from Cambridge, Inc., the assignee of the present application. A grid conveyor belt, as shown generally in U.S. Pat. No. 6,354,432, the entire contents of which are hereby incorporated by reference, includes a plurality of spaced transverse rods slidably interconnected by at least two rows of U-shaped connecting links, i.e., the tension bearing members, disposed respectively along the inner and outer edges of the rods. The terminal ends of the transverse rods are formed into enlarged heads or button heads which retain the links on the rods and welds are then provided to secure the link to the button head and to the rod, thereby preventing rotational movement of the links on the transverse rods. The connecting links are disposed in a nested relationship relative to one another with slots being provided in the links in order to slidably receive the transverse rods.

Grid conveyor belts of this type have met with overwhelming market approval because of their ability to travel in straight line conveyor paths as well as in curved conveyor paths, thus making grid conveyor belts ideal for use on spiral cage conveyors. However, when the belt is in need of repair due to breakage or maintenance, the presence of the button head ends and welded ends requires the use of special tools such as a grinder and bolt cutter and welding in order to part an endless belt or to reconnect or splice two separate ends of a belt. In addition, special threaded connector rods with end nuts have to be used to replace the rods with the button head ends when performing repair/maintenance in the field.

Figure 1:
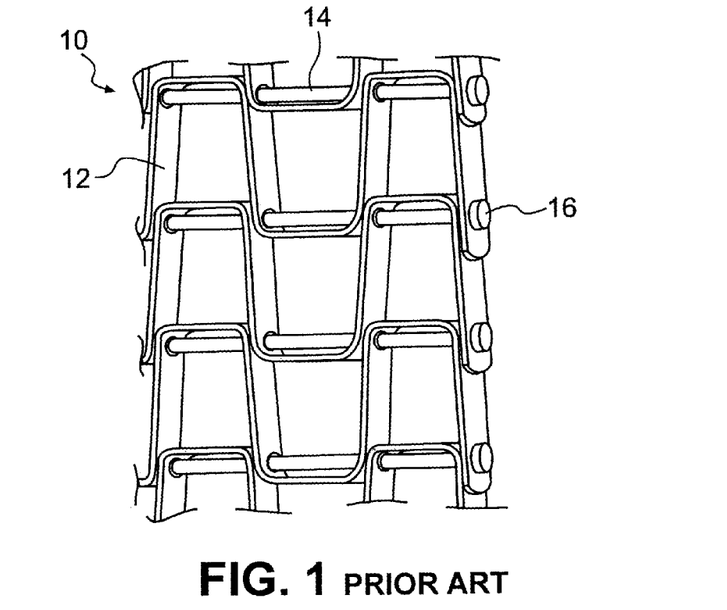
FIG. 1 is a perspective view of a segment of a conventional flat wire conveyor belt.
Figure 2:
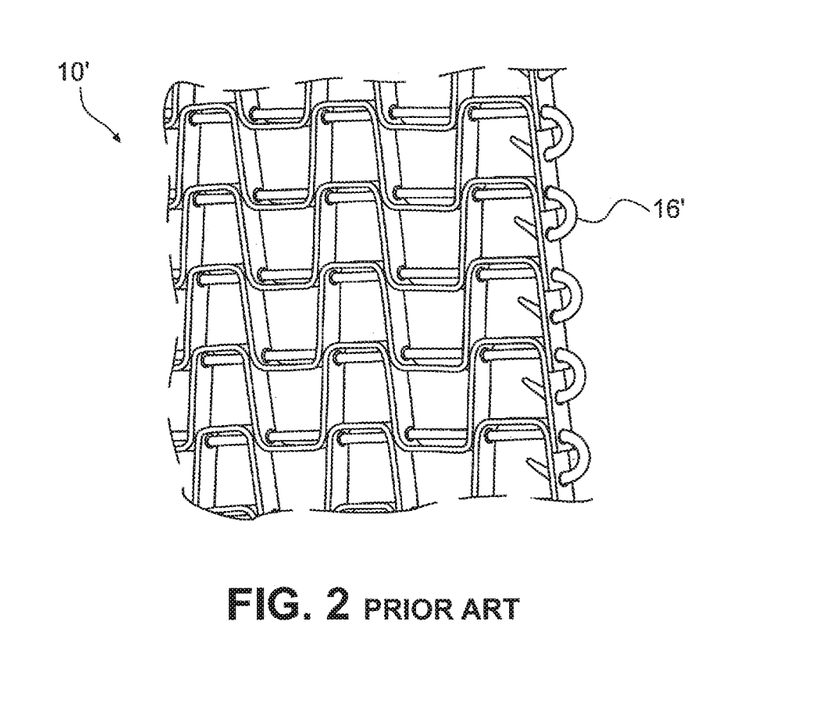
FIG. 2 is a perspective view of a segment of a second type of conventional flat wire conveyor belt.

Flat wire conveyor belts have also been in the market for many years, as shown for example in U.S. Pat. No. 2,619,306, the contents of which are hereby incorporated by reference. Flat wire conveyor belts are generally low maintenance and when positively driven with sprockets have little to no lateral shifting. With reference to FIG. 1, there is disclosed a flat wire conveyor belt 10 comprising a plurality of pickets 12, sometimes also referred to as wickets, and interconnecting rods 14 about which the pickets hinge. The pickets of the belt define the tension bearing members and support the product to be conveyed and the rods are utilized to hold the components of belt together. This type of flat wire conveyor belts also utilize upset rod ends 16, i.e., button head shaped ends, for rod retention. The compression between the pickets keep them from moving inward of the button head ends, while the button head ends prevent the pickets from moving outwardly. Flat wire conveyor belts of this type can also be used in both straight and turn applications. A second type of flat wire conveyor belt 10', as shown in FIG. 2, utilizes mechanically clinched rod ends 16' for rod retention. These types of belts are used only in straight run applications.

Flat wire conveyor belts have similarly met with long term market approval. However, when the belt is in need of repair due to breakage or maintenance, the presence of the button head or clinched rod ends requires the use of special tools such as a grinder or bolt cutters and welding or special hand tools in order to part an endless belt or to reconnect or splice two separate ends of a belt. In addition, special threaded or partially clinched connector rods with end nuts have to be used to replace the rods when performing repair/maintenance in the field.

While market trends are dictating that improvements be made to reduce conveyor system down time, employers are finding that maintenance resources are decreasing in both quantity and skill base. Accordingly, there exists a need in the marketplace for a flat wire conveyor belt having a splice system that can quickly and easily be used to splice together and repair a conveyor belt with a minimal use of tools or skill.

SUMMARY

A conveyor belt system including a plurality of spaced tractive rods, a plurality of rows of flat wire pickets transversely disposed with respect to a direction of travel and interconnecting said plurality of spaced tractive rods, wherein at least one of said rows of flat wire pickets includes an outer edge link on each end thereof, said outer edge link including a reverse-turn closed edge on an outer side thereof; and wherein movement of at least one of said plurality of rods is restricted by the reverse-turn closed edge on one said outer edge link.

A further aspect of the disclosure is directed to a conveyor belt comprising a plurality of pivotal transverse rods extending laterally across the belt, said transverse rods having inner and outer ends along inner and outer edges of the belt; a plurality of edge links arranged in at least one longitudinal row along the inner and outer edges of the belt and pivotally interconnecting the inner and outer ends of the transverse rods, respectively, each of said edge links having a pair of longitudinally extending legs and an opening extending laterally through each said leg, wherein an outer leg of each said edge link includes a reverse-turn closed edge having an opening therein; wherein said inner and outer ends of said transverse rod are disposed through said openings in said outer legs and movement of said transverse rod is restricted by the reverse-turn closed edge.

Still further, the disclosure encompasses a method of manufacturing a conveyor belt. The method comprises providing a plurality of transverse rods including two opposing ends; providing a plurality of wickets or links having a first pair of openings extending laterally therethrough and a second pair of openings extending therethrough, said outermost edge wickets or edge links including a reverse-turn closed edge; arranging the transverse rods through the first and second pair of openings so as to pivotally interconnect the transverse rods in a longitudinally spaced arrangement;

and wherein movement of said ends of said rods is restricted by the reverse-turn closed edge on one said outermost edge wicket or edge link.

BRIEF DESCRIPTION OF THE DRAWING FIGURES

These and other objects, features, and advantages of the disclosure herein will become more readily apparent to those skilled in the art upon reading the following detailed description, in conjunction with the appended drawings in which.

DETAILED DESCRIPTION OF THE PREFERRED EMBODIMENT

Figure 3:
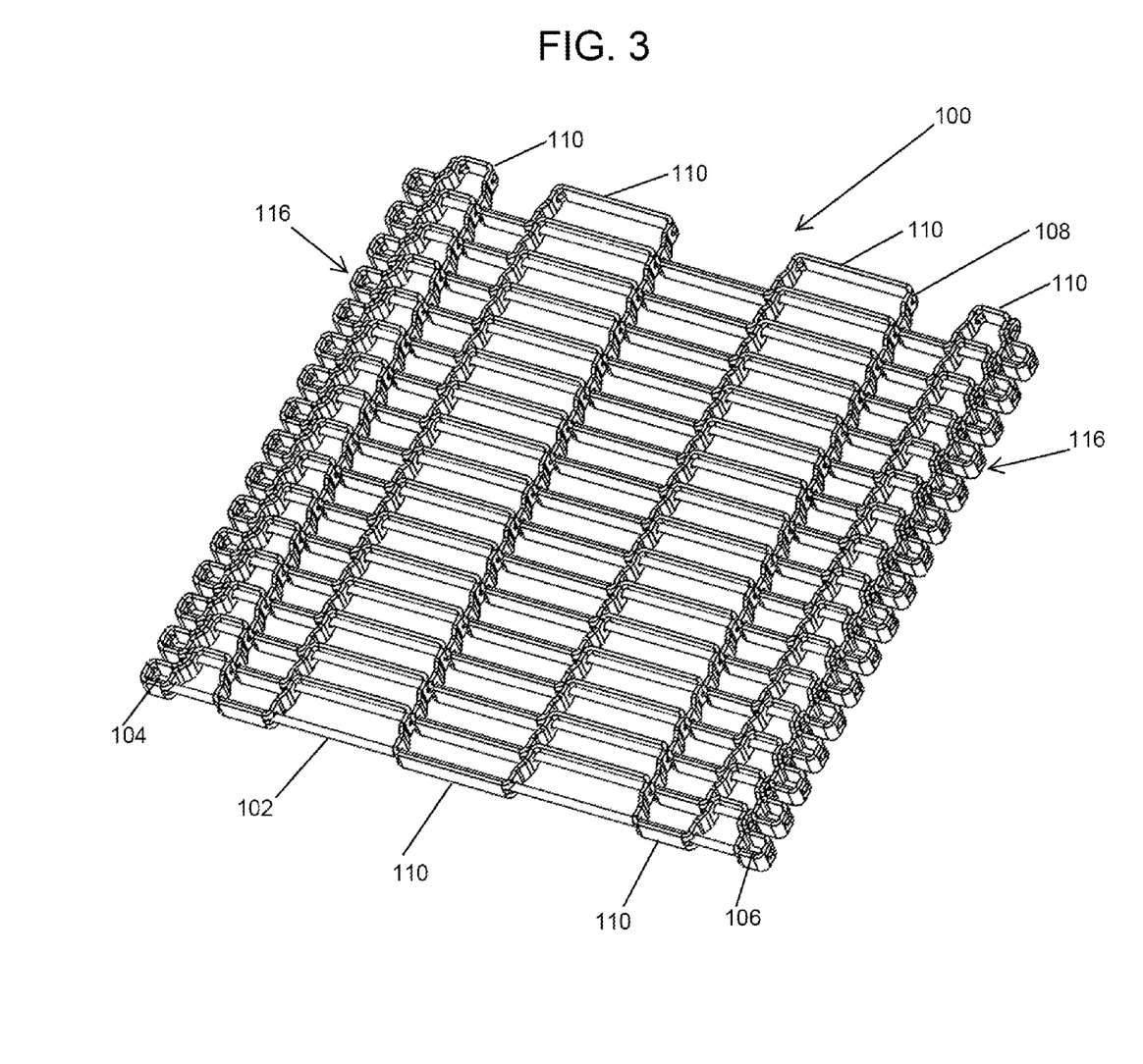
FIG. 3 is a perspective view of a flat wire conveyor belt according to an exemplary embodiment of the present disclosure.
Figure 4:
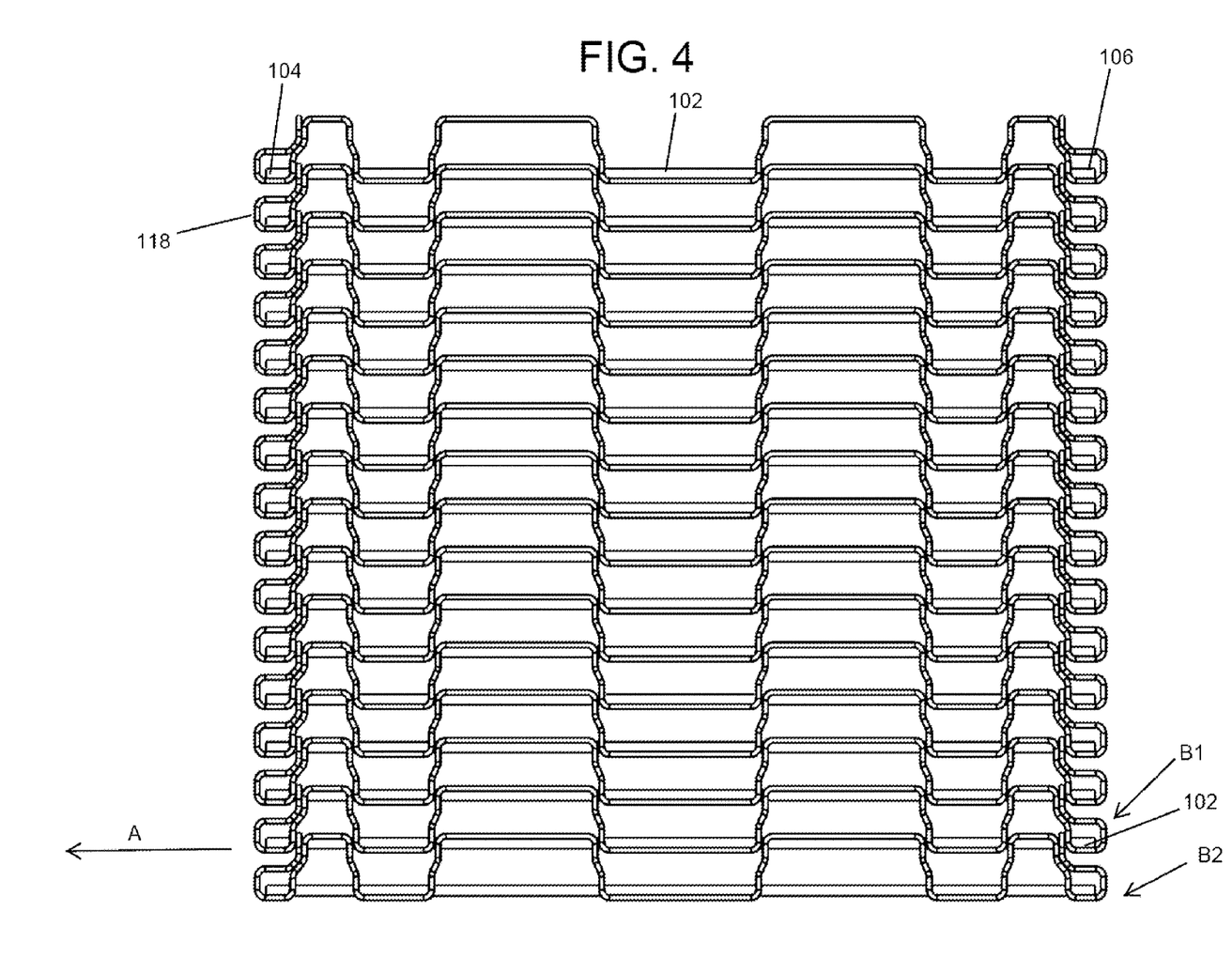
FIG. 4 is a top elevational view of the flat wire conveyor belt shown in FIG. 3.

A conveyor belt in accordance with an exemplary embodiment is shown generally in FIG. 3 by reference numeral 100. Conveyor belt 100 preferably comprises a flat wire conveyor belt including a plurality of spaced tractive rods 102 disposed in succession and transversely with respect to a direction of travel, each rod 102 having two ends 104 and 106. Other types of conveyor belts having a plurality of rods and edge links on at least one outer edge thereof could of course also be configured in accordance with the disclosure herein.

Belt 100 includes a plurality of rows of pickets 108 transversely disposed with respect to the direction of travel, and interconnecting the succession of rods 102. Each row of pickets 108 is comprised of a plurality of links 110, each link connecting a rod 102 with a following rod 102 in the succession. Moreover, the links 110 include openings 114 proximal each terminal end which define slots sized to allow the ends 104, 106 of the rod 102 to pass freely through the pickets 108.

Figure 5:
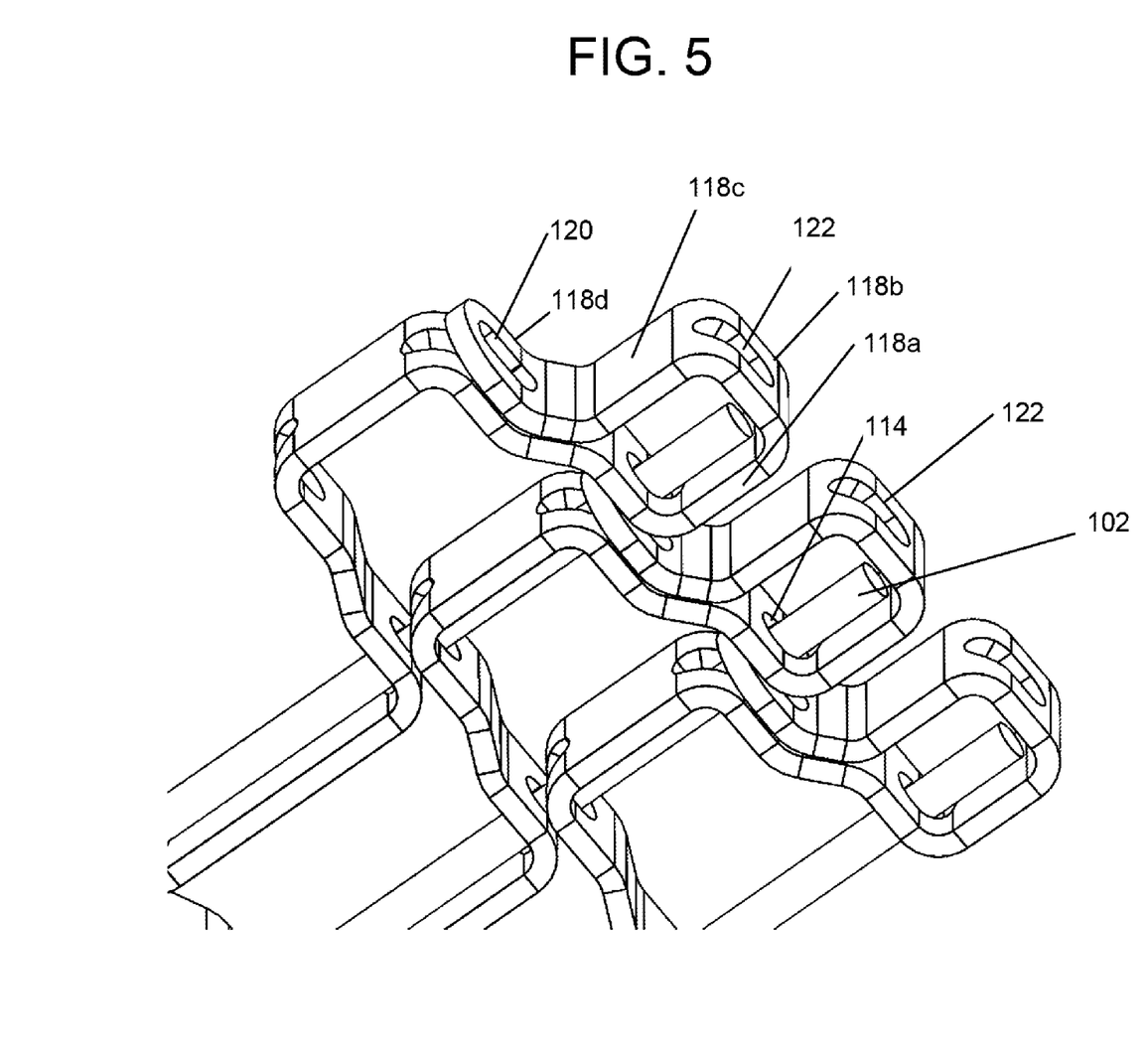
FIG. 5 is an enlarged perspective view of an edge portion of the flat wire conveyor belt shown in FIG. 3.
Figure 6:
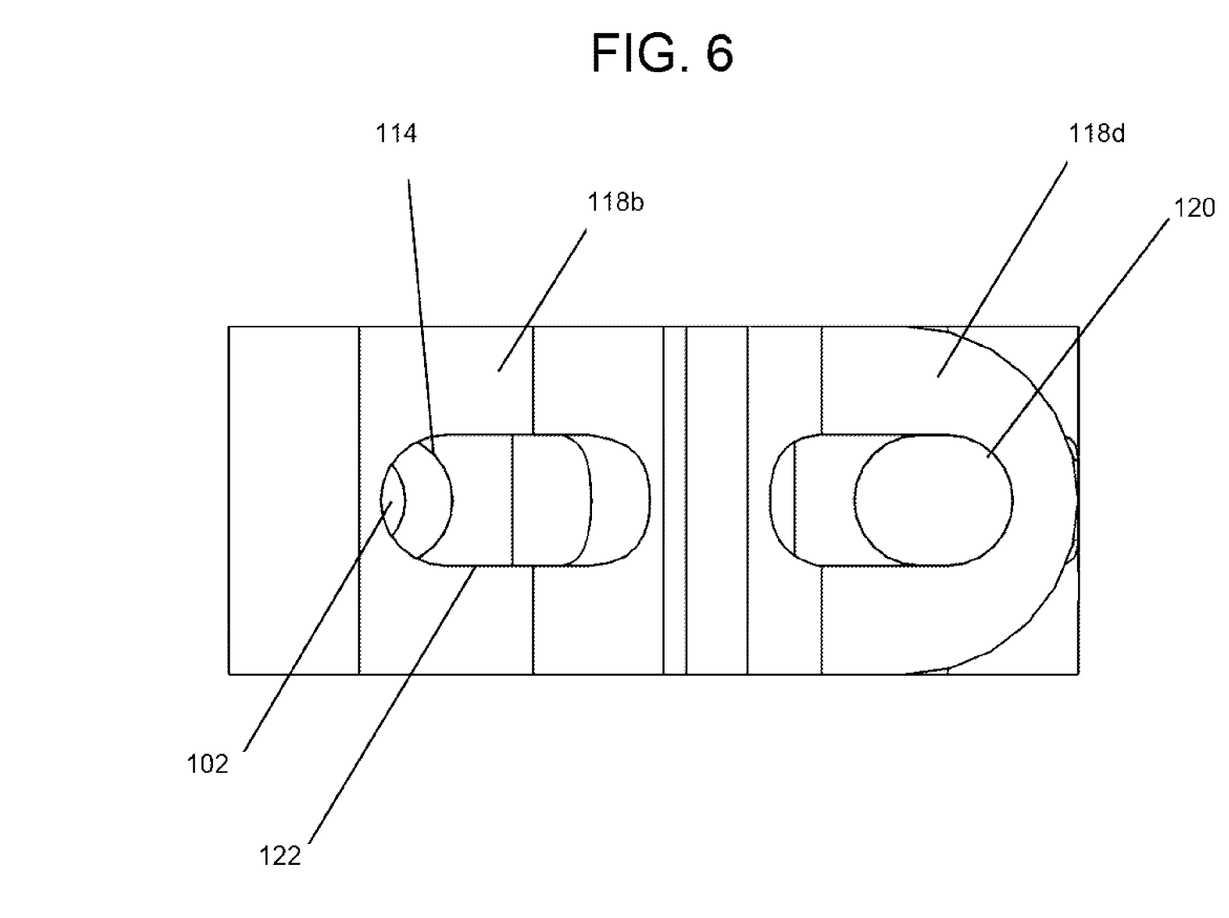
FIG. 6 is a partial enlarged side view of the flat wire conveyor belt shown in FIG. 3.

As shown in FIGS. 3-6, in order to secure the connecting rods 102 after they are inserted through the pickets, the outer ends 116 of the picket 108 are modified to form a reverse-turn closed edge 118 outside of the outermost edge link 100. As best shown in FIG. 5, the closed edge 118 includes an outwardly projecting segment 118a extending parallel to the connecting rod 102, a stop segment 118b generally perpendicular to segment 118a extending in the direction of travel of the conveyor belt 100, an inwardly projecting segment 118c extending generally parallel to the connecting rod 102 extending from the stop segment 118b to a side of the outermost link 110, and a terminal segment 118d adjacent the side of the outermost link 110. The closed edge 118 also includes a first opening 120 in the terminal segment 118d and a second opening 122 in the stop segment 118b. In a preferred embodiment, the openings 120, 122 define slotted openings in the belt edge. When fully assembled, as shown, the ends 104, 106 of the rods 102 are mechanically locked in place by the stop segment 118b on the belt edge. More particularly, the reverse-turn closed edge 118 is configured such that the ends 104, 106 of the rods 102 are offset from the center of edge 118 and do not pass through the openings 122 when in use. This finishing method allows for less complicated and time intensive repairs during operation, and eliminates the need for welding, clenching or weaving pickets.

In order to splice together two ends of flat wire conveyor belts, for example B1 and B2, to obtain an "endless" conveyor belt, the pickets 108 of the two belts are aligned in succession and a rod 102 serving as a spice rod between belts B1 and B2 is inserted in the direction of arrow A through the link openings 114 of the respective rows of pickets 108 while the pickets are relieved of tension and slightly bent, as explained further below. When the rod 102 is disposed completely through the pickets, the rod ends 104, 106 are locked in place by the closed edge 118.

Figure 7:
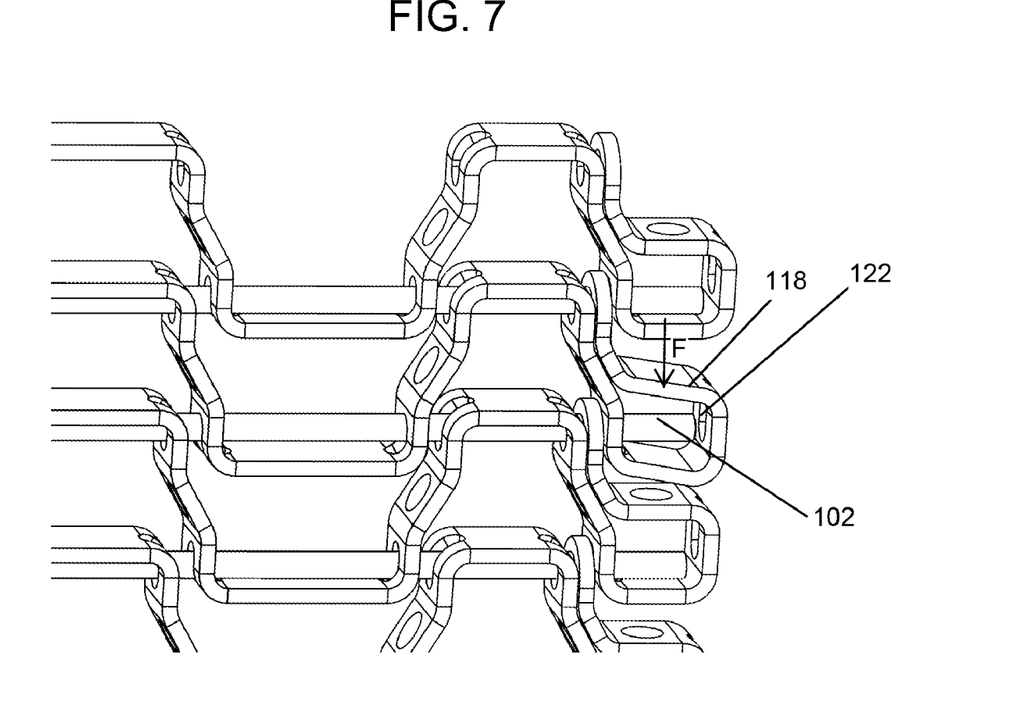
FIG. 7 is an enlarged partial perspective view of the flat wire conveyor belt shown in FIG. 3, when bent for connecting rod insertion or removal.
Figure 8:
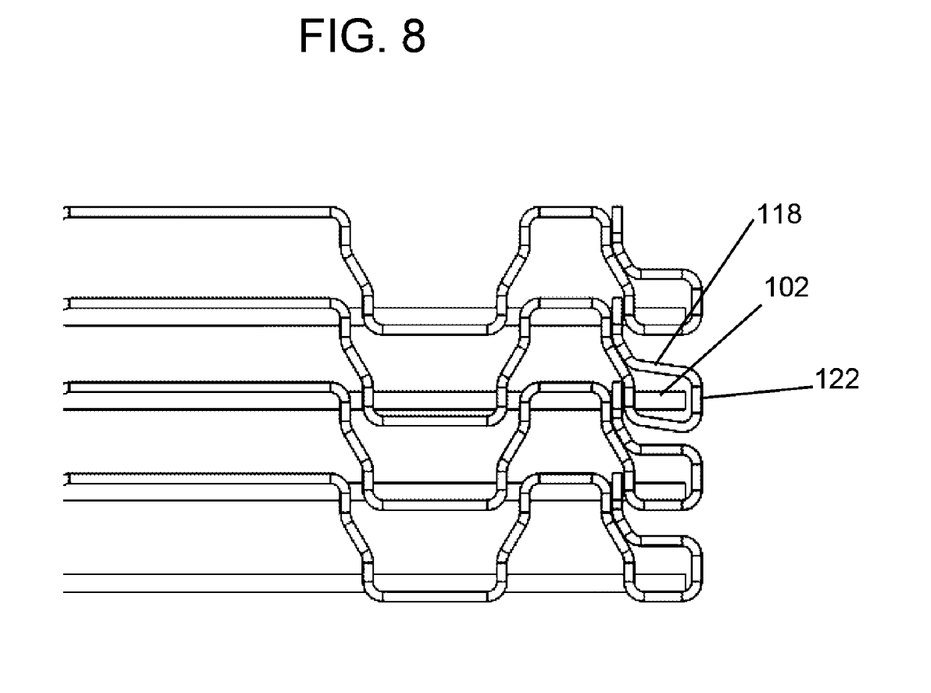
FIG. 8 is a top view of the flat wire conveyor belt shown in FIG. 7.
Figure 9:
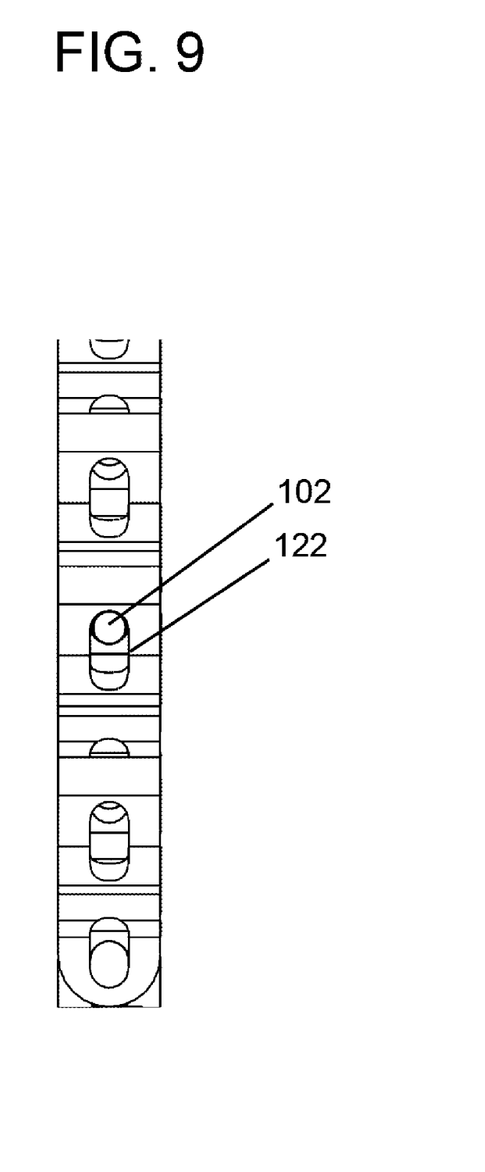
FIG. 9 is a side view of the flat wire conveyor belt shown in FIG. 7.

When it is necessary to take a belt apart, such as to remove a damaged picket for example, this process can be easily reversed for removal of the same. That is, in the event of a needed repair or replacement, the conveyor belt 100 can easily be taken apart at any given picket 108. Parting the belt is done by relieving the selected picket 108 of tension and slightly bending the belt edge 118 and rod 102 to create sufficient clearance for the rod 102 to become aligned with the second slotted opening 122. The rod 102 is then removed from the conveyor belt 100 by being guided out through the slotted opening 122 in the belt edge 118. As shown best in FIGS. 7-9, a force F is applied to the belt edge 118 sufficient to cause it to slightly bend. In so doing, the rod 102 is then aligned with the opening 122 and can be removed (or inserted) therethrough. The force F may be applied with a hand tool such as a screwdriver, pliers, or specially configured implement.

While the disclosure herein has been described with respect to a particular exemplary embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

We claim:

1. A conveyor belt comprising:
   at least one rod; and
   at least a first link and a second link;
   wherein the first link and the second link are connected by the rod;
   wherein the first link defines a reverse-turn closed edge on an outer side of the first link, the reverse-turn closed edge includes an outwardly projecting segment, a stop segment extending from the outwardly projecting segment, an inwardly projecting segment extending from the stop segment, and a terminal segment extending from the inwardly projecting segment and oriented adjacent to the outer side;
   wherein the stop segment of the reverse-turn closed edge of the first link is configured to mechanically lock the rod; and wherein at least a portion of the terminal segment of the reverse-turn closed edge of the first link is nested between the second link and the outer side of the first link.

2. The conveyor belt of claim 1, wherein the reverse-turn closed edge further defines a first opening in the terminal segment and a second opening in the stop segment.

3. The conveyor belt of claim 1, wherein the second link includes a reverse-turn closed edge on an outer side of the second link, the reverse-turn closed edge defines an outwardly projecting segment, a stop segment extending transversely from the outwardly projecting segment, an inwardly projecting segment extending transversely from the stop segment, and a terminal segment extending transversely from the inwardly projecting segment and positioned adjacent to the outer side of the second link.

4. The conveyor belt of claim 3, wherein the portion of the terminal segment of the reverse-turn closed edge of the first link is nested between the reverse-turn closed edge of the second link and the outer side of the first link.

5. The conveyor belt of claim 1, wherein:
the first link is a flat wire picket; and
the second link is a flat wire picket.

6. A conveyor belt comprising:
a first row having:
  a first link including a first side defining a first side first opening and a first side second opening spaced from the first side first opening; and
  a first reverse-turn closed edge proximate to the first side, the first reverse-turn closed edge comprising:
    a first outwardly projecting segment extending from the first side of the first link away from the first side of the first link;
    a first stop segment extending from the first outwardly projecting segment, the first stop segment defining a first stop segment opening that is offset from the first side first opening and the first side second opening of the first link;
    a first inwardly projecting segment extending from the first stop segment toward the first side of the first link; and
    a first terminal segment extending from the first inwardly projecting segment, the first terminal segment defining a first terminal segment opening;
a second row having:
  a second link including a second side defining a second side first opening and a second side second opening spaced from the second side first opening; and
  a second reverse-turn closed edge proximate to the second side, the second reverse-turn closed edge comprising:
    a second outwardly projecting segment extending from the second side of the second link away from the second side of the second link;
    a second stop segment extending from the second outwardly projecting segment, the second stop segment defining a second stop segment opening that is offset from the second side first opening and the second side second opening of the second link;
    a second inwardly projecting segment extending from the second stop segment toward the second side of the second link; and
    a second terminal segment extending from the second inwardly projecting segment, the second terminal segment defining a second terminal segment opening; and
a rod positioned to extend through the second side first opening of the second link, the second terminal segment opening of the second link, and the first side second opening of the first link;
wherein the second terminal segment is positioned between the first side of the first link and the second side of the second link.

7. The conveyor belt of claim 6, wherein the first stop segment is configured to inhibit the rod from passing through the first stop segment opening.

8. The conveyor belt of claim 6, wherein the first stop segment opening is partially overlapping with the first side second opening of the first link as projected transverse to a direction of travel of the conveyor belt.

9. The conveyor belt of claim 6, wherein:
the first row is a first flat wire picket; and
the second row is a second flat wire picket.

10. The conveyor belt of claim 6, wherein the second stop segment opening is a slot.

11. A flat wire picket configured to be interconnected to adjacent flat wire pickets by rods to form a conveyor belt, the flat wire picket comprising:
a continuous flat wire defining an outer edge link formed from the continuous flat wire and a reverse-turn closed edge that extends from the outer edge link and is formed from the continuous flat wire;
wherein the reverse-turn closed edge is configured to include an outwardly projecting segment, a stop segment extending from the outwardly projecting segment, an inwardly projecting segment extending from the stop segment, and a terminal segment extending from the inwardly projecting segment; and
wherein the reverse-turn closed edge terminates at the terminal segment defined by a terminal free end of the continuous flat wire oriented adjacent to the outer edge link.

12. The flat wire picket of claim 11, wherein the stop segment of the reverse-turn closed edge is configured to mechanically lock a rod interconnecting the flat wire picket to an adjacent flat wire picket.

13. The flat wire picket of claim 11, wherein the terminal segment of the reverse-turn close edge is configured to nest between the outer edge link and an adjacent flat wire picket.

14. The flat wire picket of claim 13, wherein the terminal segment defines an opening.

15. The flat wire picket of claim 13, wherein the stop segment defines an opening.

* * * * *